United States Patent [19]
Schindler et al.

[11] 3,899,496
[45] Aug. 12, 1975

[54] PRODUCTION OF 1-AMINOALKANE-1,1-DIPHOSPHONIC ACIDS

[75] Inventors: Norbert Schindler, Monheim-Baumberg; Walter Ploger, Hilden Rhld., both of Germany

[73] Assignee: Henkel & Cie GmbH, Dusseldorf, Germany

[22] Filed: Nov. 21, 1973

[21] Appl. No.: 417,710

Related U.S. Application Data

[63] Continuation of Ser. No. 184,635, Sept. 28, 1971, abandoned.

[52] U.S. Cl...... 260/293.51; 260/247; 260/247.2 R; 260/247.2 B; 260/247.5 G; 260/293.63; 260/293.65; 260/293.72; 260/293.81; 260/293.88; 260/502.5

[51] Int. Cl.......................................... C07d 295/04

[58] Field of Search...... 260/247, 247.2 R, 247.2 B, 260/293.63, 293.65, 293.88, 293.72, 293.81, 502.4 R, 502.4 A, 502.5, 293.51, 247.5 G

[56] References Cited
UNITED STATES PATENTS

| | | | |
|---|---|---|---|
| 2,900,408 | 8/1959 | Blaser et al. | 260/461 |
| 3,288,846 | 11/1966 | Irani et al. | 260/500 |

FOREIGN PATENTS OR APPLICATIONS

| | | | |
|---|---|---|---|
| 1,002,355 | 2/1957 | Germany | 260/502.5 |

OTHER PUBLICATIONS

Bosshard et al., Helv. Chim. Acta 42, 1653–1658, (1959).
Bosshard et al., Helv. Chim. Acta 42, 1659–1671, (1959).
Hantzsch, Ber. 64, 667–678, (1931).
Kirsanov et al., Zhur. Obsh. Khim. 26 (1), 1033–1038, (1956).
Kirsanov et al., Zhur. Obsh. Khim. 28, 1887–1892, (1958).
Klages et al., Ann. 594, 21–32, (1955).

*Primary Examiner*—G. Thomas Todd
*Attorney, Agent, or Firm*—Hammond & Littell

[57] ABSTRACT

The present invention provides a process for the production of 1-aminoalkane-1,1-diphosphonic acids of the formula

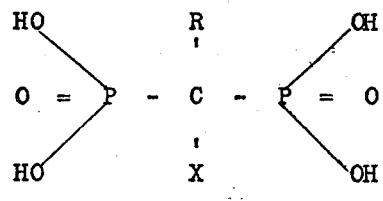

in which R represents a hydrogen atom, an alkyl residue with 1 to 12 carbon atoms, a phenyl group, a cyclohexyl group, a phenylalkyl group with 7–12 carbon atoms, a piperidinyl group, a carboxyalkyl group with 2–12 carbon atoms, or a carbalkoxy alkyl group with 3–12 carbon atoms; and in which X represents an $NH_2$ group, a piperidino group, a morpholino group or a $NR_1R_2$ group, wherein $R_1$ and $R_2$ represent alkyl residues with 1 to 4 carbon atoms, comprising reacting a corresponding compound of the formula $RCCl_2X$ or $RCBr_2X$, such as the corresponding carboxylic acid amide dichlorides or dibromides, with phosphorous acid.

11 Claims, No Drawings

PRODUCTION OF 1-AMINOALKANE-1,1-DIPHOSPHONIC ACIDS

This application is a continuation of Ser. No. 184,635, filed Sept. 28, 1971, and now abandoned.

BACKGROUND OF THE INVENTION

The invention relates to the production of 1-aminoalkane-1,1-diphosphonic acids, the amino group of which may be substituted if desired.

The preparation of 1-aminoalkane-1,1,-diphosphonic acids by reacting alkylnitriles with $PBr_3$ or $PCl_3$ is known, but satisfactory yields are obtained only with $PBr_3$. By this process it is not possible to prepare compounds in which the hydrogen atoms of the amino group are substituted, for example by alkyl residues. It is also known to prepare the N,N-dimethyl-1-aminomethane-1,1-diphosphonic acid tetraethyl ester by reacting dimethylformamide-diacetal with diethyl phosphite. This process is troublesome, chiefly because the esters have still to be converted into the free acids.

OBJECTS OF THE INVENTION

It is therefore an object of the present invention to provide an improved process for the production of 1-aminoalkane-1,1-diphosphonic acids in which the hydrogen atoms of the amino groups are substituted, for example by alkyl residues.

It is another object of the present invention to provide an improved process for the production of 1-aminoalkane-1,1-diphosphonic acids in which the intermediate step of converting the ester into the free acid has been eliminated.

It is a further object of the present invention to provide a process of the production of 1-aminoalkane-1,1-diphosphonic acids of the formula

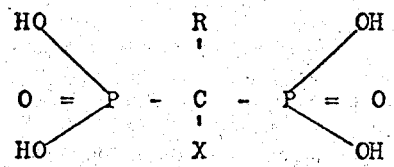

in which R represents a hydrogen atom or an alkyl residue with 1 to 12 carbon atoms, a phenyl group, a cyclohexyl group, a phenylalkyl group with 7–12 carbon atoms, a piperidinyl group, a carboxyalkyl group with 2–12 carbon atoms, or a carbalkoxy alkyl group with 3–12 carbon atoms; and in which X represents an $NH_2$ group, a piperidino group, a morpholino group or a $NR_1R_2$ group, wherein $R_1$ and $R_2$ represent alkyl residues with 1 to 4 carbon atoms, comprising reacting a corresponding compound of the formula $RCCl_2X$ or $RCBr_2X$, such as the corresponding carboxylic acid amide dichlorides or dibromides, with phosphorous acid.

It is a still further object of the present invention to provide the 1-aminoalkane-1,1-diphosphonic acids produced by the process of the invention.

Other and further objects of the present invention will become apparent as the description thereof proceeds.

DESCRIPTION OF THE INVENTION

The present invention provides a process for the production of 1-aminoalkane-1,1-diphosphonic acids of the formula

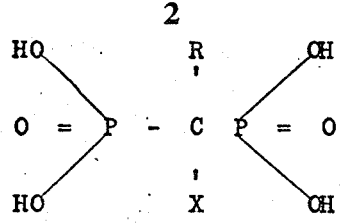

in which R represents a hydrogen atom or an alkyl residue with 1 to 12 carbon atoms, a phenyl group, a cyclohexyl group, a phenylalkyl group with 7–12 carbon atoms, a piperidinyl group, a carboxyalkyl group with 2–12 carbon atoms, or a carbalkoxy alkyl group with 3–12 carbon atoms; and in which X represents an $NH_2$ group, a piperidino group, a morpholino group or a $NR_1R_2$ group, wherein $R_1$ and $R_2$ represent alkyl residues with 1 to 4 carbon atoms, comprising reacting the corresponding compound of the formula $RCCl_2X$ or $RCBr_2X$, such as the corresponding carboxylic acid amide dichlorides or dibromides with phosphorous acid.

The carboxylic acid amide dichlorides or dibromides are prepared by methods known from the literature, which are not the object of the present invention. Processes for the preparation of these compounds are described, for example, in Berichte der Deutschen Chemischen Gesellschaft, 1931, vol. 64, pp. 667 and following, in Liebig's Annalen der Chemie, 1955, vol. 594, pp. 21 and following, and in Helvetia Chimica Acta, 1959, vol. 42, pp. 1653 and following and 1659 and following. Suitable carboxylic acid amide derivatives are dichlorides and dibromides of carboxylic acid amides in which the residue R represents a hydrogen atom, a straight or branched chain alkyl group, a cycloaliphatic aromatic or heterocyclic group, while the said groups may contain further substituents, for example alkyl and phenyl residues, or functional groups. Preferably R represents a hydrogen atom, an alkyl residue with 1 to 12 carbon atoms, a phenyl group, a cyclohexyl group, a phenylalkyl group with 7–12 carbon atoms, a piperidinyl group, a carboxyalkyl group with 2–12 carbon atoms, or a carbalkoxy alkyl group with 3–12 carbon atoms. Thus suitable starting materials for the preparation of the aminoalkanediphosphonic acids include the dichlorides and dibromides of the following compounds: acetamide, isobutyramide, valeramide, capramide, lauramide, cyclohexanecarboxylic acid amide, benzamide, phenylacetamide, hydrocinnamamide, pyridinecarboxylic acid amides and carbethoxyacetamide.

The hydrogen atoms of the amino group in the said acid amide dichlorides or dibromides may also be substituted by the same or different alkyl residues with 1 to 4 carbon atoms. Finally, acid amide dichlorides or dibromides may be used in which the substituents of the amino group together with the nitrogen atom form a heterocyclic ring, for example a piperidine or morpholine ring. Examples of the last described group of compounds are the dichlorides and dibromides of the following carboxylic acid amides: dimethylformamide, diethylformamide, dibutylformamide, piperidinoformamide, dimethylacetamide, diethylacetamide, dimethylbenzamide and morpholinocyclohexanecarboxylic acid amide.

It has been found expedient to react the carboxylic acid amide dihalides with phosphorous acid in the molar ratio of 1 : 2 to 1 : 0.5. A molar ratio of 1 : 1 is preferably used. The reaction may be effected without addition of heat. If desired, the reaction can be carried out in the presence of a solvent, for example, carbon tetrachloride, dimethylformamide or diethyl ether, or other inert solvents.

Hydrogen halide is evolved during the reaction, and an increase in viscosity and temperature of the reaction mixtures simultaneously occurs. When the reaction is suitably carried out, cooling is unnecessary.

After the end of the reaction the reaction mixture is treated with water. 1-Aminoalkane-1,1-diphosphonic acids which are sparingly soluble or insoluble in water are filtered off and washed. The water-soluble compounds of this series can be precipitated from their aqueous solutions by addition of suitable solvents such as acetone, methanol, ethanol or isopropanol.

The aminodiphosphonic acids prepared by the new process may be used as complex-forming compounds for many technical purposes. For example, they may be used for softening water, and in cleaning processes, especially in bottle washing, or for removing deposits from fabrics in washing processes. Further, they are suitable as additions to dyebaths for textiles, for binding metal ions which produce undesired shades of color.

The present invention will be further described with reference to the following specific examples which are not to be deemed limitative of the invention.

EXAMPLE 1

25.6 g (0.2 mol) of dimethylformamide dichloride, suspended in 100 ml of dimethylformamide, are mixed with 32.6 g (0.4 mol) of phosphorous acid while stirring. Hydrogen chloride is immediately evolved in the strongly exothermic reaction. After cooling the reaction mixture, the solvent is distilled off and the viscous oil remaining is dissolved in water. After addition of acetone, the N,N-dimethylaminomethane-1,1-diphosphonic acid separates as crystals.

Yield: 25.0 g (57 percent of theory).

EXAMPLE 2

25.6 g (0.2 mol) of crystalline dimethylformamide dichloride are mixed with 16.4 g (0.2 mol) of crystalline phosphorous acid. The reaction mixture becomes liquid with evolution of hydrogen chloride and heat. After cooling, the product is dissolved in water and is treated with acetone until the N,N-dimethylaminomethane-1,1-diphosphonic acid separates.

Yield: 16.5 g (75 percent of theory).

EXAMPLE 3

32.8 g (0.4 mol) of crystalline phosphorous acid are added to 25.6 g (0.2 mol) of crystalline dimethylformamide dichloride. The reaction mixture becomes liquid with evolution of hydrogen chloride and heat. After cooling, the product is dissolved in water and treated with acetone until the N,N-dimethylaminomethane-1,1-diphosphonic acid separates.

Yield: 26 g (60 percent of theory).

EXAMPLE 4

16 g (0.2 mol) of dimethylformamide are introduced while stirring, into 42 g (0.2 mol) of phosphorous pentachloride suspended in 200 ml of carbon tetrachloride. The reaction mixture is stirred for a further 10 minutes. 33 g. (0.4 mol) of phosphorous acid are added, also with stirring, to the suspension, which now consists of carbon tetrachloride, phosphorous oxychloride and the dimethylformamide dichloride. With evolution of hydrogen chloride and heat, an oily phase is formed which is taken up in 100 ml of water and the aqueous solution is separated and then evaporated. The oil remaining is dissolved in a little water, and the solution is treated with acetone until the crystalline N,N-dimethylaminomethane-1,1-diphosphonic acid separates.

Yield: 23.5 g (54 percent of theory).

EXAMPLE 5

28.4 g (0.2 mol) of crystalline dimethylacetamide dichloride are treated with 32.8 g (0.4 mol) of crystalline phosphorous acid. The reaction mixture becomes liquid with evolution of hydrogen chloride and heat. After cooling, the viscous oil is dissolved in water and the solution is treated with acetone until the N,N-dimethylaminoethane-1,1-diphosphonic acid separates.

Yield: 17.5 g (38 percent of theory).

EXAMPLE 6

20.5 g (0.1 mol) of dimethylbenzamide dichloride are treated with 8 g (0.1 mol) of phosphorous acid. A viscous reaction product is formed with evolution of hydrogen chloride and heat and the product, after cooling, is dissolved in water and treated with acetone until it becomes turbid. After some hours crystalline 1-phenyl-1-dimethylaminomethane-1,1-diphosphonic acid separates.

Yield: 4 g (27 percent of theory).

EXAMPLE 7

22.5 g (0.2 mol) of piperidinoformamide are introduced into 42 g (0.2 mol) of phosphorus pentachloride suspended in 200 ml of carbon tetrachloride, and after stirring for 15 minutes, 16.5 g (0.2 mol) of phosphorous acid are added. With the evolution of HCl and heat, an oily phase separates and this is dissolved in water. The solution is then separated, and the 1-piperidinomethane-1,1-diphosphonic acid is precipitated therefrom by addition of acetone or ethanol.

Yield: 14.5 g (56 percent of theory).

EXAMPLE 8

114 g (1.0 mol) of acetamide dichloride are treated with 82 g (1.0 mol) of phosphorous acid at about 0°C. The reaction mixture becomes hot with liquefaction and evolutions of HCl. After the exothermic reaction has subsided and the mixture has cooled to room temperature, the viscosity has greatly increased. The reaction product is then dissolved in water, and the 1-aminoethane-1,1,-diphosphonic acid separates on addition of acetone.

Yield: 52 g (51 percent of theory).

EXAMPLE 9

315 g (1.0 mol) of capramide dibromide are mixed with 82 g (1.0 mol) of phosphorous acid. Hydrogen bromide is evolved in an exothermic reaction. After the reaction has subsided, the crude product is dissolved in water and the 1-aminodecane-1,1-diphosphonic acid precipitated with acetone.

Yield: 92 g (58 percent of theory).

EXAMPLE 10

176 g (1.0 mol) of benzamide dichloride are mixed with 82 g (1.0 mol) of phosphorous acid. The mixture becomes hot and hydrogen chloride is evolved. After the reaction has subsided, the crude product is dissolved in water and the 1-amino-1-phenylmethane-1,1-diphosphonic acid is precipitated with acetone.

Yield: 58 g (43 percent of theory)

EXAMPLE 11

280 g (1.0 mol) of phenylacetamide dibromide are mixed with 82 g (1.0 mol) of phosphorous acid, when the mixture becomes hot with evolution of hydrogen bromide. After the reaction has subsided, the crude product is dissolved in water and the crystalline 1-amino-2-phenyl-ethane-1,1-diphosphonic acid is precipitated by addition of acetone.

Yield: 100 g (72 percent of theory).

EXAMPLE 12

275 g (1.0 mol) of carbethoxyacetamide dibromide are mixed with 82 g (1.0 mol) of phosphorous acid. After the exothermic reaction in which hydrogen bromide is formed has subsided, the crude product is dissolved in water and the 1-amino-2-carboxyethane-1,1-diphosphonic acid is precipitated by addition of acetone or ethanol. When the acid thus obtained is not homogeneous according to a paper chromatogram, it is heated with concentrated aqueous hydrobromic acid and then precipitated again.

Yield: 25–40 percent.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. A process for the production of 1,1-diphosphonic acids of the formula

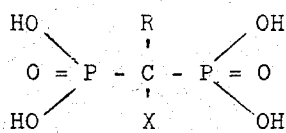

in which R represents a member selected from the group consisting of hydrogen, alkyl with 1 to 12 carbon atoms, phenyl, cyclohexyl, phenylalkyl with 7 to 12 carbon atoms, piperidinyl, carboxyalkyl with 2 to 12 carbon atoms, and carbalkoxy alkyl with 3 to 12 carbon atoms; and in which X represents a member selected from the group consisting of $NH_2$, piperidino, morpholino and $NR_1R_2$, wherein $R_1$ and $R_2$ represent alkyl with 1 to 4 carbon atoms, consisting of reacting the corresponding amide dihalide compounds of the formula selected from the group consisting of $RCCl_2X$ and $RCBr_2X$, wherein R and X have the above-assigned meanings, with phosphorous acid; and recovering said 1,1-diphosphonic acids.

2. The process of claim 1 in which said amide dihalide is reacted with phosphorous acid in the molar ratio of 1:2 to 1:0.5.

3. The process of claim 2 in which said amide dihalide is reacted with phosphorous acid in the molar ratio of 1:1.

4. A process for the production of 1,1-diphosphonic acids of the formula

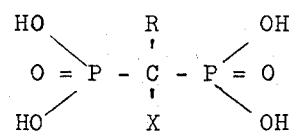

in which R represents a member selected from the group consisting of hydrogen, alkyl with 1 to 12 carbon atoms, phenyl, cyclohexyl, phenylalkyl with 7 to 12 carbon atoms, piperidinyl, carboxyalkyl with 2 to 12 carbon atoms, and carbalkoxy alkyl with 3 to 12 carbon atoms; and in which X represents a member selected from the group consisting of $NH_2$, piperidino, morpholino and $NR_1R_2$, wherein $R_1$ and $R_2$ represent alkyl with 1 to 4 carbon atoms, consisting of reacting the corresponding amide dihalide compounds of the formula selected from the group consisting of $RCCl_2X$ and $RCBr_2X$, wherein R and X have the above-assigned meanings, with phosphorous acid; said amide dihalide compounds being dissolved in an inert solvent; and recovering said 1,1-diphosphonic acids.

5. The process of claim 4 wherein said inert solvent is selected from the group consisting of carbon tetrachloride, dimethylformamide, and diethyl ether.

6. The process of claim 4 in which said amide dihalide is reacted with phosphorous acid in the molar ratio of 1:2 to 1:0.5.

7. The process of claim 5 in which said amide dihalide is reacted with phosphorous acid in the molar ratio of 1:1.

8. A process for the production of N,N-dimethylaminomethane-1,1-diphosphonic acid consisting of reacting dimethylformamide suspended in carbon tetrachloride, with phosphorus pentachloride, reacting the resultant suspension consisting of carbon tetrachloride, phosphorus oxychloride and the corresponding amide dichloride, with phosphorous acid; and recovering said 1,1-diphosphonic acid.

9. The process of claim 8 wherein said amide dichloride and said phosphorous acid are reacted in a molar ratio of 1:2 to 1:0.5.

10. The process of claim 9 wherein said molar ratio is 1:1.

11. A process for the production of 1-piperidinomethane-1,1-diphosphonic acid consisting of reacting piperidinoformamide suspended in carbon tetrachloride, with phosphorus pentachloride, reacting the resultant suspension with phosphorous acid; and recovering said 1-piperidinomethane-1,1-diphosphonic acid.

* * * * *

UNITED STATES PATENT OFFICE
CERTIFICATE OF CORRECTION

Patent No. 3,899,496                    Dated August 12, 1975

Inventor(s) Norbert Schindler et al.

It is certified that error appears in the above-identified patent and that said Letters Patent are hereby corrected as shown below:

On the cover sheet insert:

-- [30] Foreign Application Priority Data

Oct. 6, 1970    Germany    2048912 --.

Signed and Sealed this eleventh Day of May 1976

[SEAL]

Attest:

RUTH C. MASON
*Attesting Officer*

C. MARSHALL DANN
*Commissioner of Patents and Trademarks*